Nov. 3, 1964   J. W. BROWN, JR., ETAL   3,155,404
UNION FOR CONNECTING CONDUITS
Filed Dec. 17, 1963   4 Sheets-Sheet 1
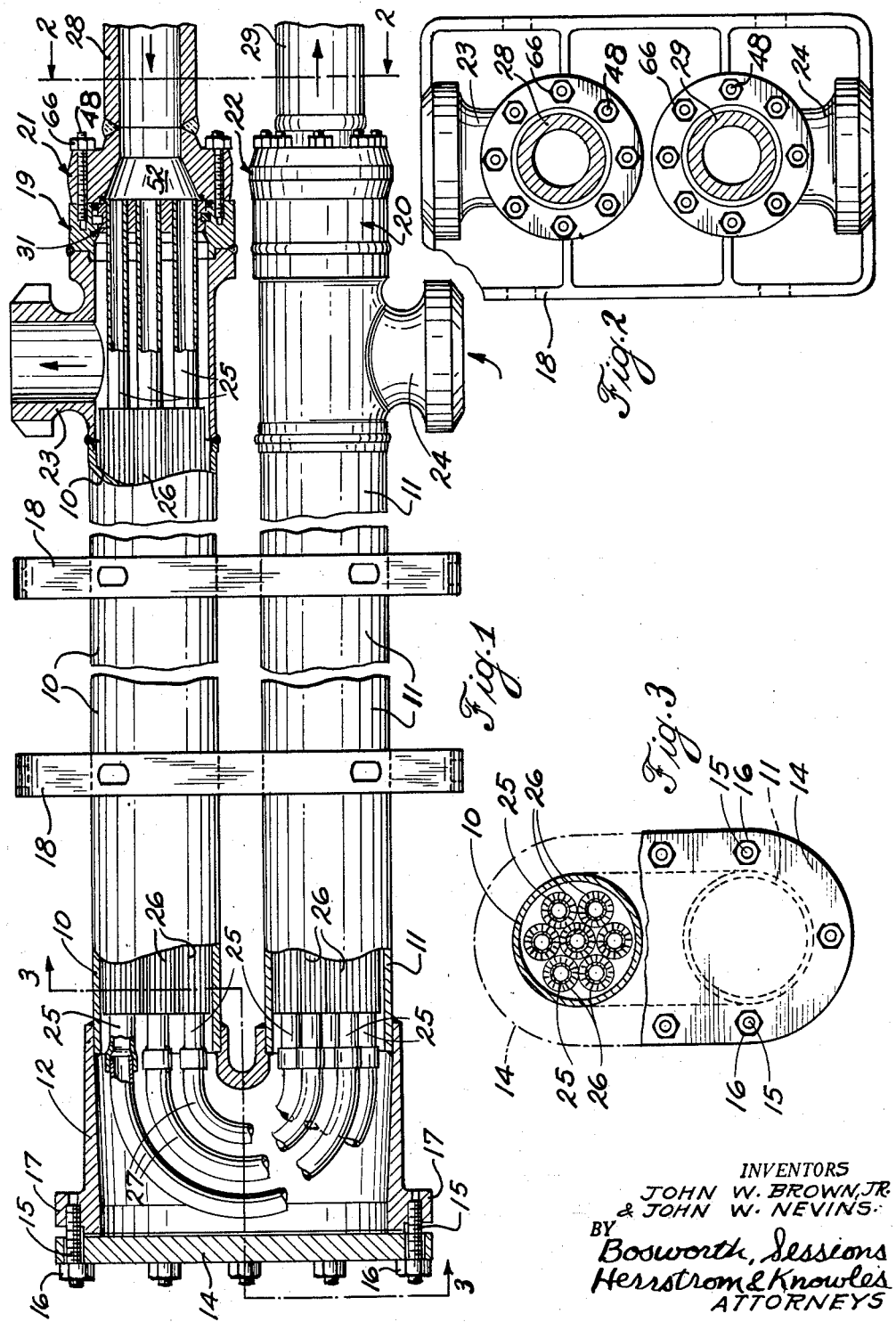
INVENTORS
JOHN W. BROWN, JR.
& JOHN W. NEVINS
BY
Bosworth, Sessions
Herrstrom & Knowles
ATTORNEYS

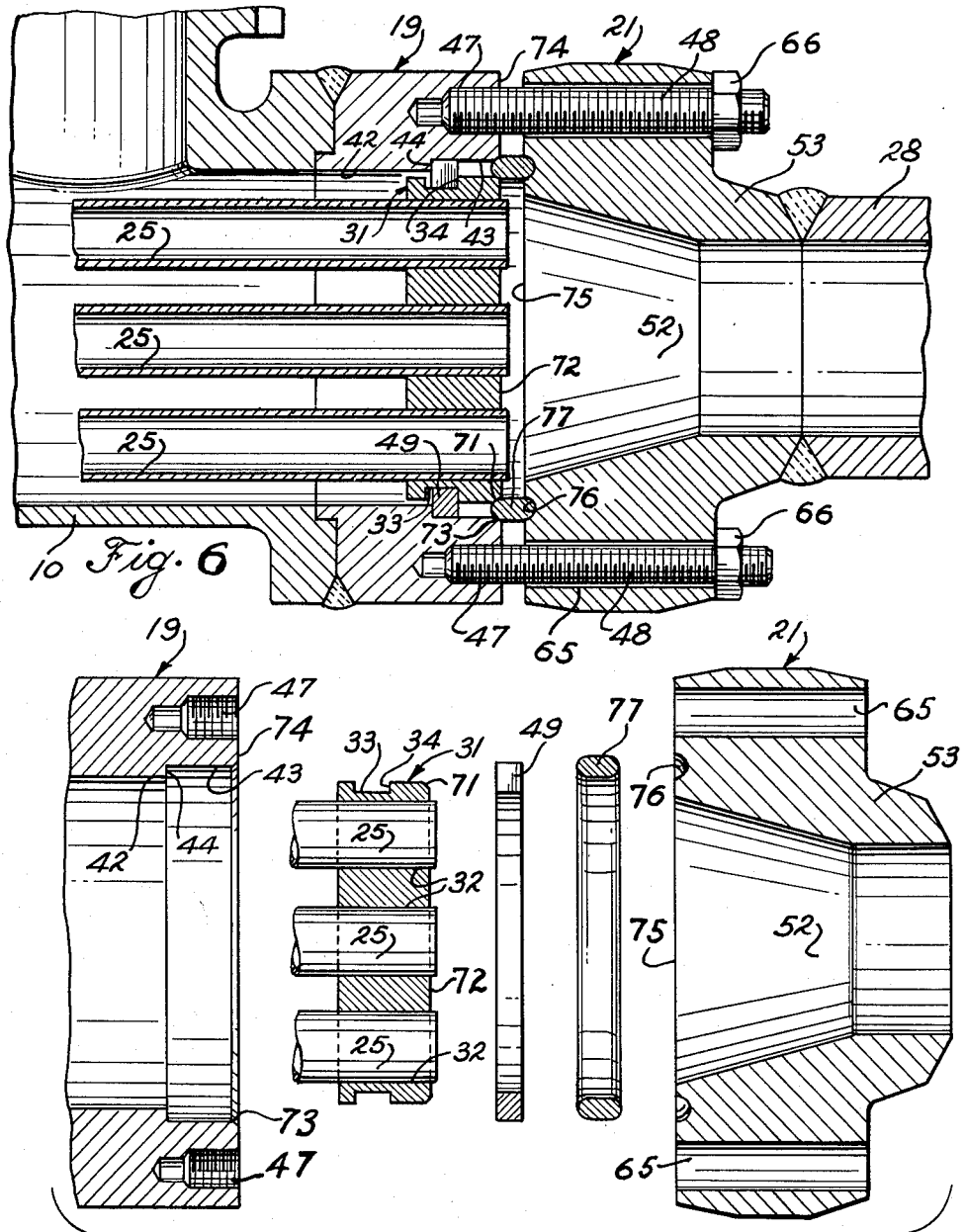

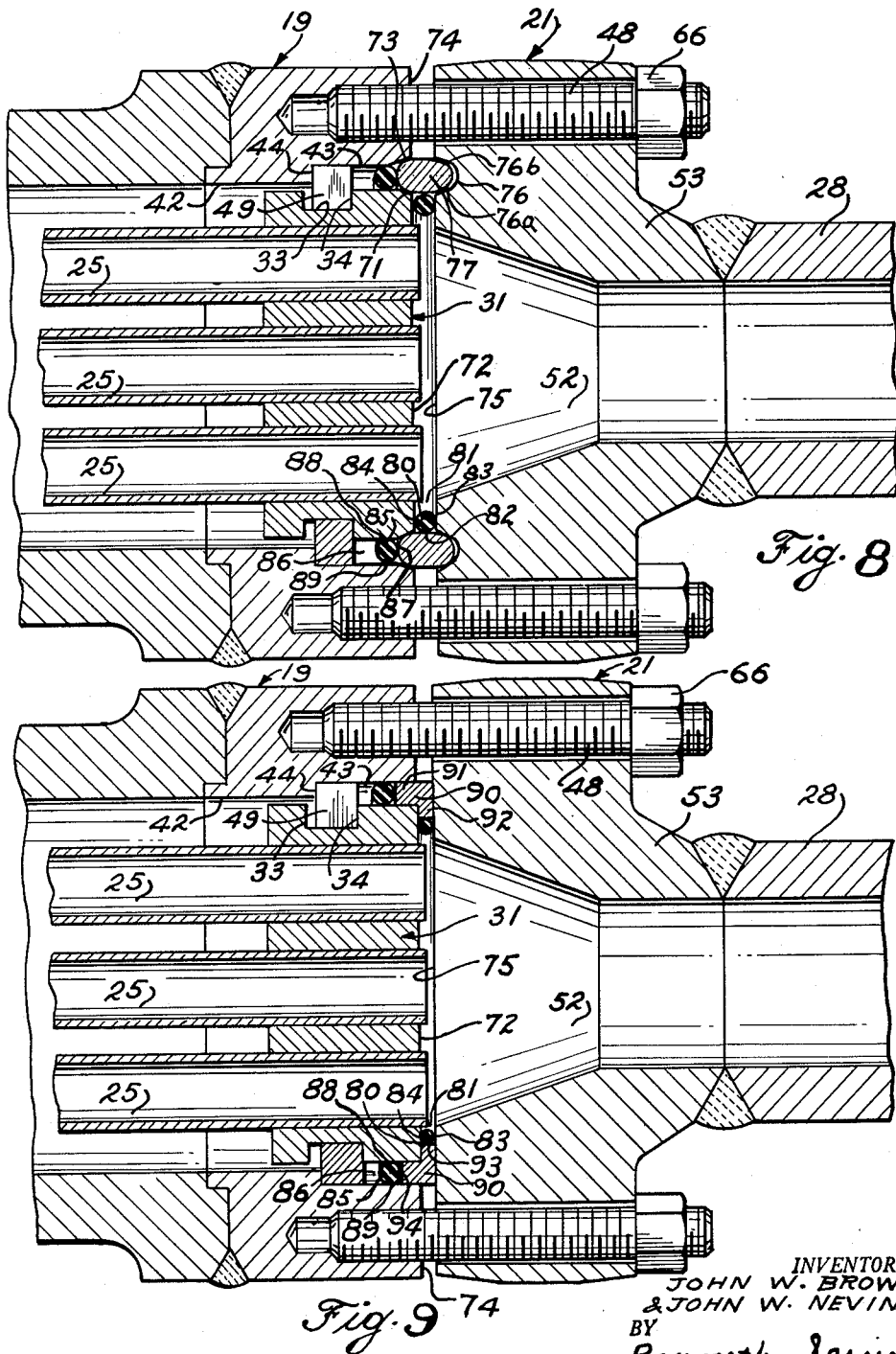

United States Patent Office 3,155,404
Patented Nov. 3, 1964

3,155,404
UNION FOR CONNECTING CONDUITS
John W. Brown, Jr., Lakewood, and John W. Nevins, Elyria, Ohio, assignors to Brown Fintube Company, Elyria, Ohio, a corporation of Ohio
Filed Dec. 17, 1963, Ser. No. 331,267
7 Claims. (Cl. 285—137)

This invention relates to unions for connecting conduits, and more particularly to unions for connecting three or more conduits.

This application is a continuation in part of our prior applications Serial No. 13,096, filed March 7, 1960 and Serial No. 32,349, filed May 27, 1960, both now abandoned.

A general object of the invention is to provide a simple and efficient union for joining three conduits so that they provide two passages containing fluids which should not intermix, as is required in heat exchangers. Another object is to provide such a union which will withstand extremely high pressures without leakage, and which can be manufactured at relatively low cost. Another object is to provide such a union that is particularly advantageous in heat exchangers embodying an outer shell and one or more inner tubes. Other objects are the provision of such a union that can be assembled or disassembled readily without requiring special tools or equipment and without applying any great or unusual forces to the union or to an assembly connected by such union, and the provision of such union in which there is no possibility of intermingling of the fluids passing through inner and outer tubes because of leaking joints. More specific objects include the provision of a heat exchanger embodying an assembly of one or more inner tubes which can be easily removed and replaced because of the union of the invention; the provision of a union for joining one or more inner tubes of a heat exchanger to an inlet or outlet pipe and to the interior of the surrounding outer shell; the provision of a simple, inexpensive connection which is leakproof even at high pressures; the provision of a union that is particularly advantageous in hairpin type heat exchangers because it makes possible the ready assembly or disassembly of the hairpin inner tubes through the rear of the heat exchanger while permitting ready access, from the front of the exchanger to the sealing surfaces and sealing means for assembly, inspection, cleaning, or repair.

Further objects and advantages of the invention will become apparent from the following description of several forms thereof, reference being made to the accompanying drawings in which:

FIGURE 1 is a side elevation, with parts broken away, of multiple tube heat exchanger of the hairpin type comprising one form of union embodying our invention;

FIGURE 2 is a front elevation of the heat exchanger shown in FIGURE 1, the view being taken as indicated by line 2—2 of FIGURE 1;

FIGURE 3 is a rear elevation along line 3—3 of FIGURE 1, parts being broken away;

FIGURE 6 is an enlarged axial sectional view of the end portion of a similar heat exchanger comprising another union embodying the invention;

FIGURE 7 is an exploded view to the same scale of the parts making up the assembled union of FIGURE 6;

FIGURE 8 is an enlarged axial sectional view of the end portion of a similar heat exchanger comprising still another union embodying the invention; and FIGURE 9 is an enlarged axial sectional view of the end portion of a similar heat exchanger incorporating another union embodying the invention.

Figure 4:
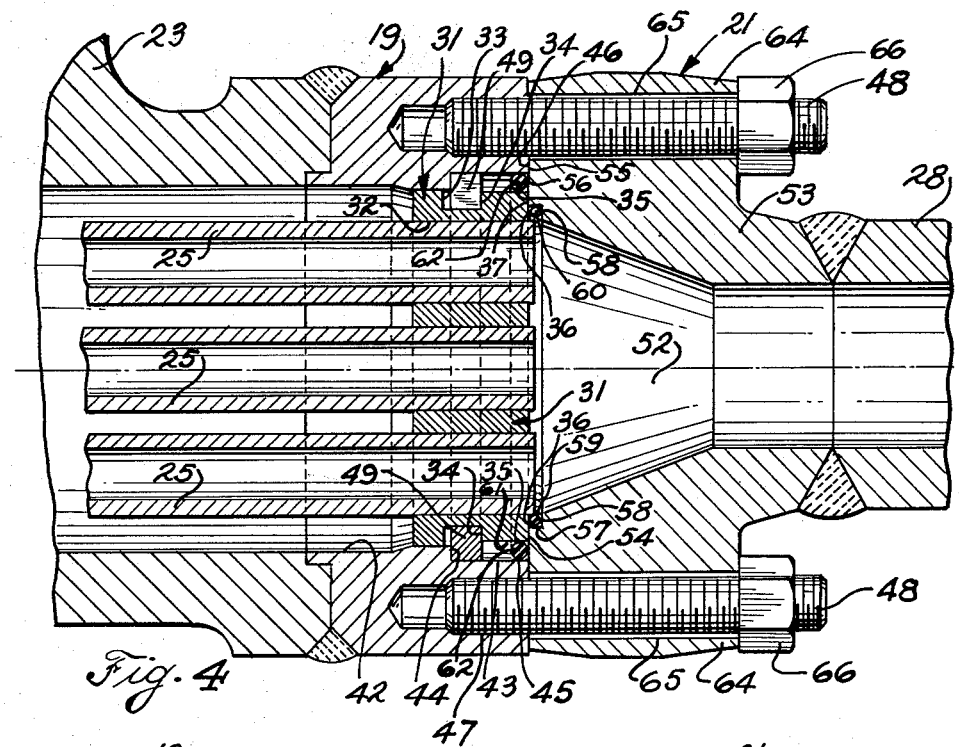
FIGURE 4 is an enlarged axial sectional view showing the union at one end of one of the shell tubes of the heat exchanger.

As shown in FIGURES 1, 2 and 3 of the drawings, a preferred form of heat exchanger embodying our invention comprises a shell made of a pair of outer conduits or tubes 10 and 11 disposed one above the other with their axes substantially parallel. These are connected together at their rear ends through a return housing 12; the tubes are welded to the front of the housing, as shown. Housing 12 is also formed with an open rear end which is closed by a cover 14 secured by studs 15 and nuts 16 to the flange 17 of the housing; the interiors of the housing 12 and shell tubes 10 and 11 are thus available for easy assembly or disassembly of the heat exchanger, and for inspection, cleaning and repair.

The outer tubes 10 and 11 may be supported by frame members 18 or any other convenient means. The forward ends of the outer tubes are provided with end or terminal members 19 and 20 to which are connected securing members 21 and 22 fixed to the ends of conduits 28 and 29 in fluid-tight relation. A fluid is caused to flow through the outer tubes 10 and 11, being supplied and discharged through the laterally extending port members 23 and 24 that communicate with the interiors of tubes 10 and 11 near their forward ends. In the form of heat exchanger shown in the drawings, member 24 is the inlet and member 23 is the outlet, as indicated by the arrows; however, the direction of flow may be reversed if desired.

In order to provide a passage for another fluid to flow in heat exchange relation to the fluid within the outer tubes 10 and 11, a plurality of hairpin tubes 25 are disposed within tubes 10 and 11. Each tube 25 comprises two straight sections, preferably having thereon longitudinal fins 26 and connected by welded return bends 27 disposed within the housing 12. In the form of the invention shown in the drawings seven hairpin tubes are employed; a greater or lesser number may be utilized without departing from the invention. The fins 26 are provided to increase the rate of heat exchange between the fluid within the inner or hairpin tubes 25 and the fluid surrounding these tubes and within the shell tubes 10 and 11, the fins preferably are constructed in accordance with the teachings of prior Patent Nos. 2,261,136 and 2,261,137. The fluid is supplied to the interior of the inner tubes 25 through conduits or pipes 28 and 29 fixed to securing members 21 and 22; conduit 28 constitutes the inlet while conduit 29 constitutes the outlet, thus providing for counterflow of fluids in the illustrated heat exchanger. Obviously the flow can be reversed if desired; moreover, it will be evident that the pipes 28 and 29 and the port members 23 and 24 can be arranged to connect several of such heat exchanger units in series or in multiple.

In order to make the heat exchanger operative, fluid-tight connections must be provided at the front end of the exchanger between the connecting pipes 28 and 29 and the interiors of the hairpin tubes 25 to provide a sealed passage through which one fluid can flow. Also, the spaces between the exterior peripheries of the hairpin tubes 25 and the interior peripheries of the outer tubes 10 and 11 must be sealed at the ends of the outer tubes to provide another passage for containing the shell fluid that is kept separate from the fluid in interiors of the inner tubes. Furthermore, the assembly of inner hairpin tubes 25 should be capable of insertion into or withdrawal from outer tubes 10 and 11 through the rear end of the heat exchanger for assembly, inspection or repair. In addition, it is extremely desirable that the sealing means be accessible for installation, inspection and cleaning from the front of the heat exchanger. In order to make the two connections at the front of the heat exchanger efficiently and inexpensively, to provide a construction in which there is no possibility of intermingling of the fluid on the exterior of the hairpin tubes with the fluid in the interior of the hairpin tubes, and to satisfy the other requirements indicated, we provide the union shown enlarged in FIGURES 4 and 5 of the drawings. Since the unions at the ends of the outer tubes 10 and 11 are identical, only the connection or union at the front end of the upper outer tube 10 will be described in detail.

The union comprises an inner tube fitting member 31 having an outer periphery of circular cross section and including a radial tube sheet portion provided with openings 32 into which the inner tubes 25 are secured in fluid-tight relation, preferably by welding, so that they extend inwardly from member 31. Between the ends of member 31 there is an exterior annular groove 33 having an inwardly facing shoulder 34. At the outer end of member 31 and spaced axially from shoulder 34 are an axially extending external sealing surface 35 and a radially extending outwardly facing sealing surface 36, the two sealing surfaces being radially spaced from each other by radially extending end bearing surface 37.

The outer tube terminal member 19, fixed as by welding to the forward end of the outer tube 10, is provided with a circular opening 42 surrounding fitting member 31 and communicating with the interior of the outer tube 10; member 19 also has a recess or counterbore 43 of larger circular cross section terminating in an outwardly facing shoulder 44 which is disposed axially inward from shoulder 34 of member 31. An axially extending sealing surface 45 is formed at the outer end of the interior surface of terminal member 19; the sealing surface 45 is radially spaced from and opposite to the axially extending sealing surface 35 of member 31. Member 19 also has an end bearing surface 46 and openings 47 in which connecting studs 48 are threaded. In this embodiment the outer end faces of terminal member 19 and fitting member 31 are contiguous to, and preferably essentially lie in, the same plane transverse to said members.

In order to retain the fitting member 31 in its correct position and to prevent it from being moved inwardly or rearwardly into the outer tube 10 as a result of force exerted against it, a split locking ring 49 is mounted in the groove 33 on the exterior of member 31 between the inwardly facing shoulder 34 of the groove and the outwardly facing shoulder 44 in the recess 43 of terminal member 19. However, when the front of the heat exchanger is opened, the locking ring 49 may readily be released by moving the hairpin tubes 25 and fitting member 31 outwardly or toward the front of the heat exchanger a distance sufficient to bring the locking ring beyond the front or outer end of terminal member 19, from which position it can be removed. It is to be noted that the maximum external diameter of the fitting member 31 is less than the internal diameter of both terminal member 19 and of the outer tube 10; consequently after removal of the split locking ring 49 the fitting member 31 can be moved inwardly through terminal member 19 if the rear cover 14 of the exchanger is not present.

Securing member 21 has a central passageway 52 large enough at one end to clear the outer edges of the hairpin tubes 25 and at the other end small enough to match the interior of conduit 28 welded to boss 53 of member 21. Passageway 52 thus distributes fluid from pipe 28 to each of the several hairpin tubes 25.

Figure 5:
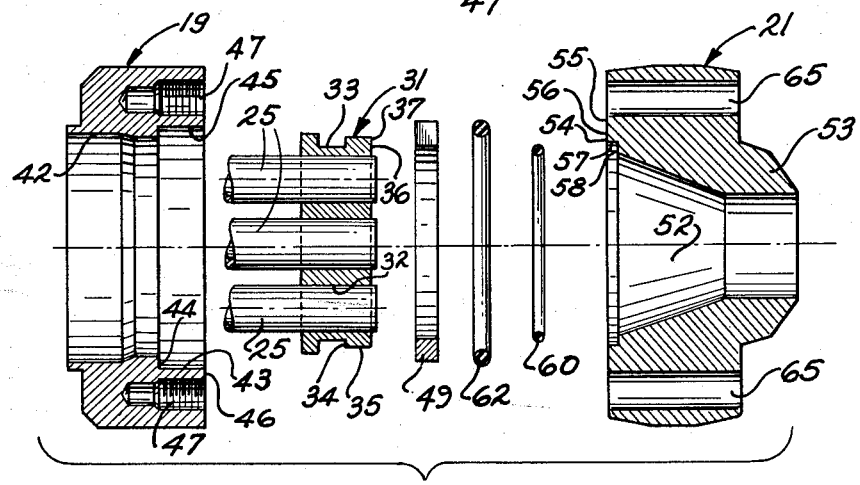
FIGURE 5 is an exploded view to a slightly smaller scale of the parts making up the assembled union of FIGURE 4.

The outer end face of member 21 confronts the outer end faces of terminal member 19 and fitting member 31, and provides spaced radially extending bearing surfaces 54 and 55 separated by a radially extending, inwardly facing sealing or stop surface 56. The outer face of member 21 also is recessed as shown to provide an axially extending sealing surface 57 and a second radially extending sealing or stop surface 58 at the bottom of the recess. When the parts are assembled, as shown in FIGURE 4, bearing surface 54 of member 21 engages bearing surface 37 of member 31, and sealing surfaces 36, 57 and 58 define an annular groove or channel 59 in which an annular sealing ring 60 is disposed. This sealing ring preferably is a conventional O ring formed of resilient, deformable material which under fluid pressure applied from the open side of the channel 59 makes effective sealing engagement with sealing surfaces 36, 57 and 58, thus preventing leakage of the commodity within the hairpin tubes.

In order to seal against leakage of the fluid within the shell 10 and on the exterior of the hairpin tubes, the radially extending sealing or stop surface 56 of member 21 and the axially extending sealing surfaces 35 and 45 of members 31 and 19 cooperate to form a circumferentially extending sealing channel 61. This channel has an open end extending axially inward and communicating with the interior of outer tube 10. A sealing ring 62 is positioned in the channel; this ring also preferably is a conventional O ring formed of resilient, deformable material which under pressure applied from the open end of channel 61 makes effective sealing engagement with the sealing surfaces 35, 45 and 56.

Member 21 is secured to terminal member 19 by the studs 48 that pass through openings 65 in flange 64 of member 21, being drawn tightly against the fitting member 31 and terminal member 19 by nuts 66 threaded on the studs. While ideally the bearing surfaces 54 and 55 of member 21 should bear with equal force against bearing surfaces 37 and 46 of members 31 and 19, this is difficult to achieve because of the need for manufacturing tolerances. Therefore, it is preferable that the parts be so proportioned that most of the pressure exerted by member 21 is applied by its bearing surface 54 against bearing surface 37 of fitting member 31 since the fluid pressure within the hairpin tubes is ordinarily substantially greater than the fluid pressure outside of such tubes.

In operation, the sealing ring 60 in annular channel 59 is exposed to and subject to the pressure of the fluid passing through the inner tubes 25. This pressure may be as great as several thousand pounds per square inch; it deforms the sealing ring and causes it to press against radially extending sealing surfaces 36 and 58 of members 31 and 51, and against axially extending surface 57. Surface 57 acts as a stop surface and restricts the sealing ring 59 against radial movement so that the ring deforms in axial directions and seals against sealing surfaces 36 and 58. The greater the pressure of the fluid in the inner tubes 25, the greater is the sealing pressure exerted by the sealing ring.

Sealing ring 62 in channel 61 is exposed to and subjected to the pressure of the fluid within the shell tube 10. This pressure is substantially greater than atmospheric pressure but usually less than the pressure of the fluid in the inner tubes. The sealing ring 62 deforms under the fluid pressure and is urged into sealing engagement with axially extending sealing surfaces 35 and 45 of fitting member 31 and outer tube terminal member 19, and radially extending sealing surface 56 of conduit member 21. The surface 56 also acts as a stop surface by restricting the sealing ring 62 against axial movement in channel 61 so that the ring deforms in radial directions and seals against sealing surfaces 35 and 45. In this case, also, higher pressures on the fluid in the outer tubes cause greater sealing pressures of the sealing ring 62 on surfaces 35 and 45.

The fluids within the exchanger will not intermingle even in the event of joint leakage. If the tube fluid should escape past sealing ring 60, the leakage would go to the exterior of the exchanger through the juncture between terminal member 19 and conduit member 21 since the other sealing ring 62 would prevent access to the interior of the outer tube. If, on the other hand, the shell fluid should escape past sealing ring 62, the leakage fluid would also travel to the exterior of the exchanger through the juncture between members 19 and 21, since the sealing ring 60 would prevent access to the chamber 52 of conduit member 21. In the remote event that there should be leakage past both sealing rings 60 and 62, the fluids would not intermingle in the exchanger since both fluids would be at pressures above atmospheric and leakage would travel to the lower atmospheric pressure.

The above described heat exchanger can be disassembled readily merely by removing the securing members 21 and 22 at the front of the exchanger and the cover 14 of housing 12 at the rear of the exchanger, sliding the hairpin tubes 25 forward to permit removal of the split locking rings 49 and then withdrawing the hairpin tubes 25 and their fitting members 31 from the rear of the heat exchanger. In reassembling the heat exchanger, the assembly of hairpin tubes 25 and their fitting members 31 can be inserted into the outer tubes 10 and 11 from the rear, the locking rings 49 placed on fitting members 31 while they project forwardly, and the sealing surfaces and sealing rings can be cleaned immediately before they are sealed and the conduit members 21 and 22 bolted on. The tightness of the joints can be determined readily by visual inspection, inasmuch as any leakage will be immediately evident at the exterior of the exchanger.

FIGURES 6 and 7 illustrate another union embodying the invention. This union is generally similar to that of the previous embodiment, and like it is shown as forming part of a heat exchanger similar to that of FIGURES 1 to 3 inclusive. In FIGURE 6, parts substantially identical to those of the previous embodiment bear the same reference numerals. In FIGURE 6, the outer conduit or tube 10 forms a part of a shell made up of a pair of similar conduits as in the previous embodiment. This outer tube 10 has fixed to it in fluid-tight relation a terminal member 19 to which is fixed a securing member 21 connected in fluid-tight relation to the conduit 28. The outer tube 10 surrounds the several inner tubes 25 which, at their outer ends, are connected in fluid-tight relation to a fitting member 31. This fitting member has an exterior periphery of circular cross section having an external annular groove 33 providing an inwardly facing shoulder 34. A generally axially extending outwardly tapered external annular surface 71 is formed on member 31 adjacent its radially extending outer end 72 and spaced axially from shoulder 34.

The terminal member 19 has a circular opening 42 surrounding fitting member 31 and communicating with the interior of outer tube 10, and a larger coaxial recess or counter bore 43 terminating in an outwardly facing shoulder 44 disposed axially inward from shoulder 34 of member 31. An axially extending outwardly tapered internal surface 73 is formed on the interior periphery of the terminal member 19 adjacent its radially extending outer face 74; tapered annular surface 73 is radially spaced from and opposite to the tapered surface 71 of member 31. Member 19 also has openings 47 in which connecting studs 48 are threaded. A split locking ring 49 is mounted in groove 33 on member 31 between the inwardly facing shoulder 34 of the groove and the outwardly facing shoulder 44 in recess 43 of terminal member 19. So long as the split locking ring is in position, fitting member 31 is limited against inward movement, but it may be readily released as described in connection with the preceding embodiment.

Fluid is conducted from pipe 28 to the interiors of hairpin tubes 25 by securing member 21 located adjacent to members 31 and 19 and having a passageway 52 that is small enough at one end to communicate with the interior of pipe 28 and large enough at the other end to communicate with the interiors of the outermost inner tubes 25. The radially extending end or outer face 75 of member 21 is located adjacent to and confronts the outer ends or faces 72 and 74 of members 31 and 19. Outer face 75 of member 21 has formed in it an annular recessed sealing surface 76 located adjacent to and directly opposite both tapered surfaces 71 and 73 of fitting member 31 and terminal member 19. An annular sealing member 77 is positioned to contact the tapered surfaces 71 and 73 and the sealing surface of recess 76 of members 31, 19 and 21; preferably, as shown, this sealing member is a continuous ring having an oblong cross section with curved ends constituting the sides of the ring, and the ring may be formed of soft iron or other similar relatively incompressible gasket material which resists compression but can conform under pressure to contact the sealing surfaces in sealing relation. When securing member 21 is drawn toward members 19 and 31 by the nuts 66 on the studs 48 it presses the curved sides of the ring 77 into sealing engagement with these sealing surfaces, which preferably are finished smoothly and accurately for this purpose.

The fluid within space comprising passageway 52 of securing member 21 and the interiors of the hairpin tubes 25 is sealed against escape by sealing engagement of the ring 77 with the sealing surface 71 of member 31 and sealing surface 76 of member 21. The fluid in the space included between the outer surfaces of the hairpin tubes 25 and the inner surface of the outer tubes 10 and 11 is similarly sealed against escape by sealing engagement of the ring 77 with sealing surfaces 73 and 76 of members 19 and 21. There is an identical union on the other leg of the heat exchanger. This heat exchanger provides all of the advantages indicated as provided by the previous embodiment and is even simpler and more durable in construction. It can be disassembled and reassembled in a manner similar to that described above.

FIGURE 8 illustrates another union embodying the invention. This union is generally similar to that of FIGURES 6 and 7 and, like the latter, is shown as forming part of a heat exchanger similar to that of FIGURES 1 to 3 inclusive. In FIGURE 8, parts substantially identical to those of the preceding embodiment bear the same reference numerals. The securing member 21 of this union has formed in its outer end face 75 an annular recess 76 providing two adjacent radially opposite generally axially extending annular tapered surfaces 76a and 76b located so that the surface 76a of smaller diameter is directly opposite tapered annular surface 71 on fitting member 31, and the surface 76b of larger diameter is located directly opposite the tapered annular surface 73 on terminal member 19.

Securing member 21, when drawn toward terminal member 19 and fitting member 31 by nuts 66 on studs 48, causes the curved side surfaces of an annular ring member 77 to closely contact under pressure the annual tapered surfaces 71 and 73 of members 31 and 19, and tapered surfaces 76a and 76b of member 21, and firmly positions the members 19, 21 and 31 relatively to each other. These surfaces are located and shaped to facilitate this function. Annular member 77 preferably has the same cross section as member 77 of FIGURES 6 and 7.

To aid in preventing escape of fluid from the space comprising the interiors of securing member 21 and hairpin tubes 25, an annular sealing ring 80 is located in the radially extending inwardly opening channel 81 formed by the axially extending inner stop surface 82 of annular member 77, an adjacent radially extending sealing surface 83 on the end of member 21, and an adjacent radially extending sealing surface 84 on the end of member 31. Sealing ring 80 preferably is a conventional O ring formed of resiliently deformable material which under the pressure of the fluid in the space makes tight sealing engagement with the surfaces forming the channel 81. Surfaces 83 and 84 preferably are finished to a high degree of smoothness and accuracy to enhance the sealing action.

To aid in preventing escape of fluid from the space between the inner surface of the outer tube and the outer surface of the inner hairpin tubes 25, an annular sealing ring 85 is located in an axially extending channel 86 formed by the radially extending side surface 87 of the annular member 77 facing members 19 and 31, an adjacent axially extending exterior surface 88 on fitting member 31 and an adjacent axially extending interior surface 89 of the terminal member 19, which channel opens inwardly. Sealing ring 85 preferably is a conventional O ring formed of resilient deformable material that under fluid pressure makes sealing engagement with the surfaces of the channel 86; surfaces 88 and 89 preferably are finished smoothly and accurately to facilitate this.

It is also preferable that the annular tapered surfaces 71, 73 and 76a and 76b be smoothly and accurately finished, and that the annular member 77 be formed of soft iron or similar gasket material that can resist compression but conform to such surfaces under compression, since additional seals will thus be formed between annular member 77 and members 21 and 31, and between annular member 77 and members 19 and 31 similar to those described above in the union of FIGURES 6 and 7. These seals and those provided by sealing rings 80 and 85 thus provide double sealing actions between the members.

The embodiment of FIGURE 8 provides all of the advantages described above in connection with the preceding embodiments, including ease of assembly and disassembly of the union and the heat exchanger of which it is a part, ease of inspection and cleaning of seals, freedom from leakage, and ability to seal effectively at high fluid pressures.

The union of FIGURE 9, which is generally similar to that illustrated in FIGURE 8, is shown as forming part of a heat exchanger like that of FIGURES 1 to 3 inclusive. Parts of the union of FIGURE 9 which are substantially identical to those of the preceding embodiments bear the same reference numerals.

The union of FIGURE 9, like that of FIGURE 8, comprises a terminal member 19 which is fixed at the end of an outer shell tube 10, a securing member 21 adjacent the end of the terminal member, and a fitting member 31 located inside of the terminal member 19 and supporting hairpin tubes 25. A continuous annular ring member 90 is shaped and positioned to firmly position the members 19, 21 and 31 in spaced relation to each other when clamped between the members when the securing member 21 is drawn toward members 19 and 31 by nuts 66 on studs 48; in this respect this ring 90 functions similarly to annular member 77 of the embodiments of FIGURES 6 to 8. The annular member 90 in this case, however, is L-shaped in cross section, and is positioned with one leg 91 of the L between the axially extending exterior surface of the fitting member 31 and the axially extending interior wall of the counter bore 43 in terminal member 19, and with the other leg 92 of the L between the radially extending end faces 72 and 75 of members 31 and 21. The annular member is preferably formed of a metal harder and stronger than soft iron in view of its complex cross section and since no sealing benefits need be gained by having it deform under pressure to conform to adjacent surfaces.

Escape of fluid from the space comprising the interiors of member 21 and hairpin tubes 25 is prevented by a sealing O ring 80 fitting in a radially extending inwardly opening channel 81 formed by inner surface 93 of ring 90 and adjacent radially extending surface 83 on the end of securing member 21, and an adjacent radially extending surface 84 on the outer end of fitting member 31. This sealing ring is preferably a conventional O ring of resiliently deformable material which, under pressure of the fluid, makes a sealing engagement with the surfaces defining the channel 80. At least surfaces 83 and 84 preferably are smoothly and accurately finished to promote sealing action.

Similarly, a sealing ring 85 in channel 86 prevents escape of fluid from the space between the exterior of hairpin tubes 25 and the interior of the outer tube 10. Channel 86, which extends axially and opens inwardly, is defined by the radially extending surface 94 of the annular member 90 facing the interior of the heat exchanger, the adjacent axially extending surface 89 forming part of the counter bore 43 in terminal member 19, and the adjacent axially extending surface 88 on the interior of fitting member 31. Preferably the sealing ring 85 is an O-ring of resilient deformable material which is pressed by the fluid into sealing engagement with the surfaces defining the channel 86, of which at least surfaces 88 and 89 are preferably accurately and smoothly finished. This union provides advantages similar to those described above in connection with the unions of the preceding embodiments. These include ease of assembly and disassembly of the union and the heat exchanger in which it is included, ease of inspection and cleaning of seals, freedom from leakage, and ability to withstand high fluid pressures.

It is to be noted that in each of the constructions illustrated as embodying the invention, the securing member is sealed directly to the fitting member fixed to the ends of the inner hairpin tubes, and to the terminal member at the end of the outer shell tube with sealing means contacting sealing surfaces on all three members. This is facilitated when, as illustrated in embodiments, the outer faces of the fitting member and surrounding terminal member lie in substantially the same radially extending plane and are confronted by the outer face of the securing member. The securing member, which may be a single, unitary massive member to withstand high internal pressures, thus carries out a dual sealing function, acts to provide leak-proof joints for the fluid within the shell but outside of the inner tubes and for the fluid inside the inner tubes, and at the same time provides a construction in which intermingling of the fluid in the tubes is prevented. Moreover, it serves to locate the fitting and terminal members relatively to each other as well as locating the securing member relatively to the other two members.

Notwithstanding these great advantages, the parts of unions of heat exchangers embodying the invention can be manufactured economically by ordinary machining operations, and can be easily and economically assembled.

The surfaces described above as radially extending need not necessarily fall within planes normal to the axes of circular cross sections, and the surfaces described as axially extending need not necessarily be cylindrical surfaces, but may vary somewhat from these configurations without departing from the scope of the invention. Furthermore, the annular ring members shown as clamped between the securing member and the fitting and terminal members may have other cross sectional configurations than those shown.

These and other modifications of the invention will be apparent to those skilled in the art. It is, therefore, to be understood that our patent is not limited to the preferred forms of the invention disclosed herein nor in any other manner than the scope of the appended claims.

We claim:

1. A union for connecting at least three conduits providing a fluid flow relation between at least two of said conduits, the first of said conduits communicating with at least one second conduit and defining a first passage through which a first fluid is adapted to flow, and the third of said conduits surrounding said second conduit in spaced relation thereto and defining between the exterior periphery of said second conduit and the interior periphery of said third conduit a second passage adapted to contain a second fluid to be kept separate from said first fluid, said union comprising a terminal member fixed in fluid-tight relation to the end portion of said third conduit and having an outer face and an inner periphery, a fitting member fixed in fluid-tight relation to the end portion of said second conduit and having an outer face and an outer periphery and disposed within said terminal member, means disposed between the inner periphery of said terminal member and the outer periphery of said fitting member to limit relative inward axial movement of said fitting member in said terminal member, a securing member fixed in fluid-tight relation to the end portion of said first conduit and having an outer face confronting the outer faces of said fitting and terminal members, means acting between said securing member and said terminal member to exert an axial force thereon to draw said terminal member and said securing member toward each other and to force said fitting member to the inward limit of its axial travel, a first sealing surface on the outer periphery of said fitting member adjacent its outer face, a second sealing surface on the inner periphery of said terminal member adjacent its outer face, a third sealing surface on said confronting outer face of said securing member in opposition to said first and second sealing surfaces, and sealing means disposed in contact with all of said sealing surfaces to thereby prevent fluid in said first passage from escaping between said fitting member and said securing member and fluid in said second passage from escaping between said fitting member and said terminal member when said force-exerting means is activated.

2. The union of claim 1 in which there is radially extending sealing surface on the outer face of said fitting member, a radially extending sealing surface on the outer face of said securing member confronting said radially extending sealing surface on said fitting member, means supported from said securing member and bearing against said fitting member and providing an axially extending internal stop surface that defines with said radially extending sealing surfaces on said fitting and securing members a first channel communicating with said first passage, an axially extending sealing surface on the inner periphery of said terminal member adjacent its outer face, an axially extending sealing surface on said fitting member adjacent its outer face, a radially extending stop surface carried by said securing member that defines with said axially extending sealing surfaces of said terminal and fitting members a second channel communicating with said second passage, a first annular sealing ring formed of resiliently deformable material disposed in said first channel and adapted to be held against said axially extending stop surface in sealing engagement with said radially extending sealing surfaces of said first channel by the pressure of fluid in said first passage, and a second annular ring formed of resiliently deformable material disposed in said second channel and adapted to be held against said radially extending stop surface in sealing engagement with said axially extending sealing surfaces of said second channel by the pressure of fluid in said second passage.

3. The union of claim 1 in which the outer faces of said fitting and terminal members are contiguous to the same plane and the outer face of said securing member bears against the outer face of said fitting member, and in which union there is a radially extending sealing surface on the outer face of said fitting member, a radially extending sealing surface on the outer surface of said securing member offset from and confronting said radially extending sealing surface on said fitting member, and axially extending internal stop surface that defines with said radially extending sealing surfaces on said fitting and securing members a first channel communicating with said first passage, an axially extending sealing surface on the inner periphery of said terminal member adjacent its outer face, an axially extending sealing surface on said fitting member adjacent its outer face, a radially extending stop surface on the outer face of said securing member that defines with said axially extending sealing surfaces of said terminal and fitting members a second channel communicating with said second passage, a first annular sealing ring formed of resiliently deformable material disposed in said first channel and adapted to be held against said axially extending stop surface in sealing engagement with said radially extending surfaces of said first channel by the pressure of fluid in said first passage, and a second annular ring formed of resiliently deformable material disposed in said second channel and adapted to be held against said radially extending stop surface in sealing engagement with said axially extending sealing surfaces of said second channel by the pressure of fluid in said second passage.

4. The union of claim 1 in which said sealing means comprises an annular ring formed of material that resists compression, said ring engaging the sealing surfaces on said securing member, terminal member, and fitting member to prevent fluid in said first passage from escaping between said fitting member and said securing member and fluid in said second passage from escaping between said fitting member and said terminal member, and urging said fitting member inwardly of said terminal member to the inward limit of its axial travel, when said force-exerting means is activated.

5. A union for connecting at least three conduits providing a fluid flow relation between at least two of said conduits, the first of said conduits communicating with at least one second conduit and defining a first passage through which a first fluid is adapted to flow, and the third of said conduits surrounding said second conduit in spaced relation thereto and defining between the exterior periphery of said second conduit and the interior periphery of said third conduit a second passage adapted to contain a second fluid to be kept separate from said first fluid, said union comprising a terminal member fixed in fluid-tight relation to the end portion of said third conduit and having an outer face and an inner periphery, a fitting member fixed in fluid-tight relation to the end portion of said second conduit and having an outer face and an outer periphery and disposed within said terminal member, means disposed between the inner periphery of said terminal member and the outer periphery of said fitting member to limit relative inward axial movement of said fitting member in said terminal member, a securing member fixed in fluid-tight relation to the end portion of said first conduit and having an outer face confronting the outer faces of said fitting and terminal members, means acting between said securing member and said terminal member to exert an axial force thereon to draw said terminal members and said securing member toward each other and to force said fitting member to the inward limit of its axial travel, a first annular bearing portion on the outer periphery of said fitting member adjacent its outer face, a second annular bearing portion on the inner periphery of said terminal member adjacent its outer face, a third annular bearing portion on the confronting outer face of said securing member in opposition to said first and second bearing surfaces, annular ring means formed of material that resists compression disposed in contact with all of said annular bearing portions to locate said fitting and terminal members transversely relative to each other and to urge said fitting member inwardly of said terminal member to the inward limit of its axial travel when said force-exerting means is activated, said annular ring means providing an axially extending internal stop surface between said fitting and securing members and a radially extending stop surface between said fitting and terminal members, a radially extending sealing surface on the outer surface of said fitting member, a radially extending seal-surface on the outer surface of said securing member, said radially extending sealing surfaces defining with said axially extending stop surface of said annular ring means a first channel communicating with said first passage, an axially extending external sealing surface on said fitting member, an axially extending internal sealing surface on the inner periphery of said terminal member, said axially extending sealing surfaces defining with said radially extending sealing surface of said annular ring means a second channel communicating with said second passage, a first annular sealing ring formed of resiliently deformable material disposed in said first channel and adapted to be held against said axially extending stop surface in sealing engagement with said radially extending sealing surfaces of said first channel by the pressure of fluid in said first passage, and a second annular ring formed of resiliently deformable material disposed in said second channel and adapted to be held against said radially extending stop surface in sealing engagement with said axially extending sealing surfaces of said second channel by the pressure of fluid in said second passage.

6. The union of claim 5 in which said annular bearing portions on said fitting terminal and securing members are sealing surfaces that are engaged in sealing relation by said annular ring means.

7. The union of claim 5 in which said annular ring means in cross section comprises a generally L shaped configuration, one leg of which has the cross section of an annular rib which fits between and contacts said fitting and terminal members, and the other leg of which has the cross section of an annular rib which fits between and contacts said fitting and securing members.

References Cited in the file of this patent

UNITED STATES PATENTS

| | | |
|---|---|---|
| 1,015,660 | Willmann | Jan. 23, 1912 |
| 1,876,627 | Davis et al. | Sept. 13, 1932 |
| 2,122,071 | Rasmussen et al. | June 28, 1938 |
| 2,330,864 | Bruno | Oct. 5, 1943 |
| 2,350,976 | Worn | June 6, 1944 |
| 2,424,221 | Brown | July 22, 1947 |
| 2,449,052 | Brown | Sept. 14, 1948 |
| 2,520,755 | Brown | Aug. 29, 1950 |
| 2,599,767 | Long | June 10, 1952 |
| 2,645,450 | Chessman | July 14, 1953 |
| 2,811,337 | Andersen | Oct. 29, 1957 |
| 3,001,804 | Tomlinson et al. | Sept. 26, 1961 |

FOREIGN PATENTS

| | | |
|---|---|---|
| 711,321 | Great Britain | June 30, 1954 |